Nov. 21, 1944.   H. J. MATTESON   2,363,010
REFRIGERANT CONTROL SYSTEM
Filed April 29, 1941

HAROLD J. MATTESON,
INVENTOR.

By John H. Rouse,
ATTORNEY.

Patented Nov. 21, 1944

2,363,010

UNITED STATES PATENT OFFICE 2,363,010

REFRIGERANT CONTROL SYSTEM

Harold J. Matteson, Glendale, Calif., assignor to General Controls Co., Glendale, Calif., a corporation of California Application April 29, 1941, Serial No. 390,914

4 Claims. (Cl. 62—127)

My present invention relates to refrigerant-control valves of the thermal expansion type, and to a novel refrigerant control system.

When a valve of the type indicated is installed in a refrigerating system, on account of the non-linear pressure-temperature curve of conventional refrigerants, the valve must be manually adjusted for the particular average cooling temperature desired in the system. This necessitates the constant attention of an experienced service man, over a period of possibly several hours, until the system is stabilized. It is therefore a main object of my invention to overcome this difficulty by providing a valve whereby the superheat of the refrigerant at the outlet of an evaporator fed by the valve is automatically maintained substantially constant over a wide range of operating temperatures.

Another object is to provide a valve of the type indicated which, in the control of a refrigerating system, requires no manual adjustment over a wide range of operating temperatures.

Another object is the provision of a refrigerant control valve of the type indicated whereby, upon initiation of operation of the system, a high degree of superheat is provided so that overloading of the system is prevented.

Another object is the provision, in a valve of the type indicated, of additional temperature responsive means for varying the effect of the temperature responsive means normally controlling the operation of the valve.

Another object is the provision of thermostatically controlled means for varying the force normally urging the valve closure member toward closed position.

Another object is the provision of a system for controlling the superheat of the refrigerant at the outlet of an evaporator, in which system the afore-mentioned valve has particular utility.

Other objects and advantages of my invention will be found in the description, the drawing, and the appended claims.

For complete understanding of the invention, reference may be had to the following detailed description and accompanying drawing, wherein.

Figure 1:
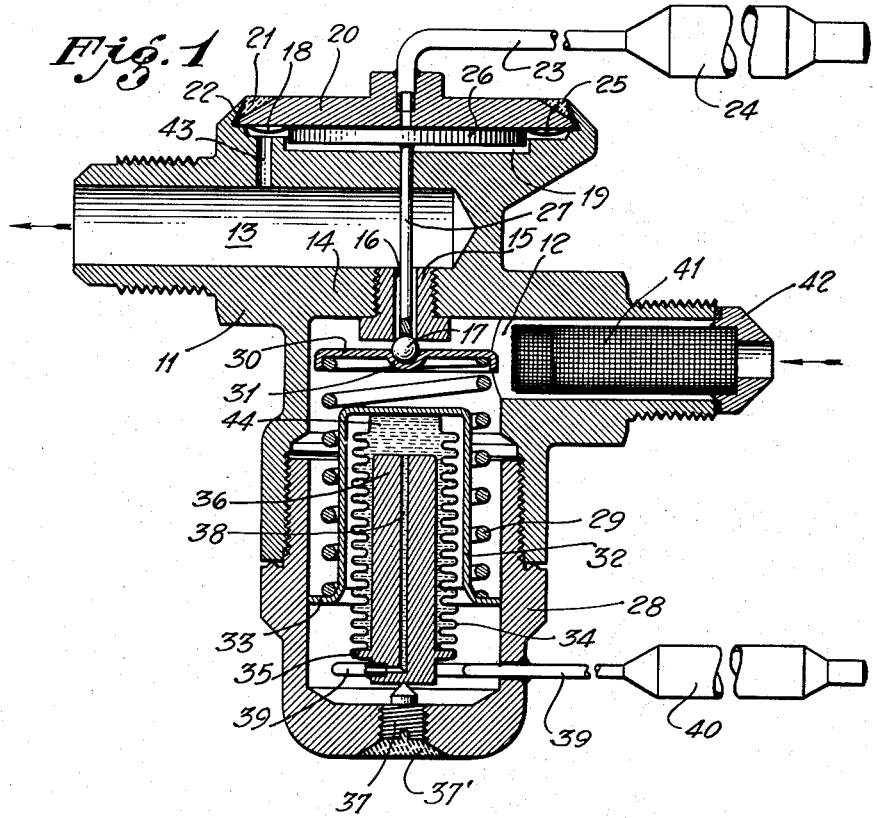
Figure 1 is a vertical sectional view of a valve embodying my invention.

Referring first to Fig. 1 of the drawing, the numeral 11 indicates a valve casing having an inlet 12 and an outlet 13 separated by a partition 14. Threaded in this partition is a member 15 having a valve port opening 16 therethrough. Cooperable with the lower end of the port is a ball-shaped closure member 17 which is urged toward closed position by means hereinafter to be described. For the actuation of the closure member, a fluid pressure operated motor is provided which comprises a flexible metallic diaphragm 18 mounted above a recess 19, formed in the upper portion of the casing, and backed by a cover member 20 which, together with the turned-up margin of the diaphragm, is secured to the casing as by solder 21, the portion of the casing surrounding the cover being rolled over as shown at 22 to provide a mechanical joint and an annular recess for the solder. Soldered in a central opening in the cover is the stem 23 of a thermal bulb 24 which contains, preferably, a volatile fluid. The pressure of this fluid is applied to a chamber 25 defined by the diaphragm and the underside of the cover, the fluid pressure tending to force the diaphragm downward upon increase of bulb temperature. Below the underside of the diaphragm is a pusher plate 26 which serves to transmit movement of the diaphragm to the closure member 17 through a rod 27. The upper end portion of this rod is guided in an opening formed in an upper portion of the casing, its lower end portion extending freely through the port opening 16 into engagement with closure member 17, the bottom end of the rod having a recess cooperating with the surface of the ball to centralize the rod in the port. In operation, the upper end of the rod is normally in engagement with the underside of the pusher plate.

Threaded in the bottom of the valve casing is a cup-shaped extension 28 wherein is located means for variably biasing the closure member 17 toward its seat. These means include a spring 29, the upper end of which carries a disk 30 having a centrally depressed portion 31 for receiving the lower portion of the ball 17. The lower portion of the spring surrounds a cylindrical shell 32 which has at its bottom an outwardly turned flange portion 33 upon which the lower end of the spring rests. The flange 33 is a free sliding fit in the chamber of extension 28.

Fluid pressure operated means are provided for variably positioning the shell 32 so that the force of spring 29 acting on the closure member is correspondingly varied. These means include an expansible-contractible metallic bellows 34, the closed upper end of which is secured, as by solder, to the underside of the top wall of the shell 32; the lower end of the bellows being soldered to the flange portion 35 of a cylindrical member 36 which is supported within the bellows by the tip of a conical-pointed adjusting screw 37 which is threaded in the bottom wall of the extension 28 and, after adjustment, sealed in position by solder 37'. The member 36 has an axial passageway 38 which communicates at its lower end with a lateral passage, in which passage is sealingly secured the end of a flexible pipe 39 which extends through an opening in the side wall of the extension 28 and is connected at its outer end to a thermal bulb 40. The pipe 39 is sealed, as by solder, to the extension 28 and has a relatively long inner looped portion which permits vertical adjustment of the member 36. The fluid pressure means for varying the force of bias spring 29 is preferably of the hydraulic type; the bulb 40, the space between the member 36 and the interior of the bellows 34, and the connecting pipe and passageway being filled with a thermally expansible liquid 44. The member 36 is of such size that the volumetric capacity of the bellows is reduced to a point at which the effect on the fluid pressure system, of change in temperature of the atmosphere surrounding the valve, is small.

Provided in the inlet passageway 12 of the casing is a strainer 41 carried by a fitting 42. Connecting the recess or chamber 19 below the pusher plate and diaphragm with the outlet 13 is an equalizer port 43.

Figure 2:
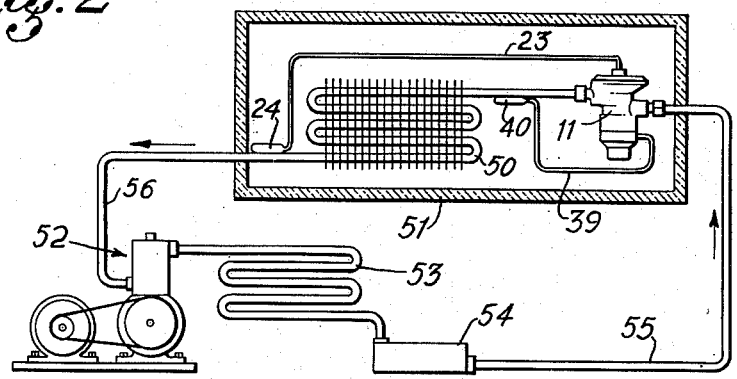
Figure 2 is a diagrammatic view of a refrigeration system illustrating the application of the valve shown in Fig. 1.

In the diagram of Fig. 2, the valve described hereinabove is shown controlling flow of refrigerant to a finned evaporator 50 which serves as a cooling unit for an insulated compartment 51. The refrigerant is supplied, in the usual manner, by a motor-driven compressor 52 and flows through condenser 53, receiver 54 and liquid line 55 to the valve; the refrigerant returning from the outlet of the evaporator 50 through a suction line 56 to compressor 52.

The valve parts are shown in Fig. 1 in the positions which they assume in normal operation of the system, the bulbs 24 and 40 being arranged to be responsive to the temperatures of the evaporator 50. The vapor-tension bulb 24 is preferably located at the outlet of the evaporator, and the liquid-filled bulb 40 preferably at the inlet of the same, as shown. However, under some conditions and with proper selection of the thermostatic fluids, both bulbs can be at the same point of the evaporator. It will be understood that my invention is not limited to the particular type of thermostatic fluid pressure systems which I have indicated as being preferred.

As will be obvious to those skilled in the art, in operation the force of spring 29 is varied by the expansion and contraction of the fluid within the bellows resulting from change in temperature of the bulb 40, substantially constant superheat of the refrigerant thus being automatically maintained. It is to be understood that the expansion and contraction of the liquid in bulb 40 is substantially a linear function while the pressure-temperature variation of the volatile fluid in bulb 24 is substantially logarithmic. Therefore, in the application of the invention, the quantity of liquid in the hydraulic system in relation to the area of the bellows should be such that the linear travel of the bellows, in combination with the rate of the bias spring, will cause the superheat setting to follow a straight line drawn between two intermediate points on the logarithmic temperature-pressure curve of the refrigerant. These points are chosen between the maximum limits between which any system controlled by the valve will ever be required to operate.

While I have herein shown and described a specific embodiment of my invention, by way of illustration, I wish it to be understood that modifications may be made without departing from the spirit of the invention and that I intend therefore to be limited only by the scope of the appended claims.

I claim as my invention:

1. In a system for cooling a space by vaporization of liquid refrigerant in an evaporator: a valve controlling passage of the refrigerant into the evaporator; a spring biasing said valve toward closed position; thermostatic means effective to open the valve, against the force of said spring, in accordance with the temperature of the refrigerant adjacent the outlet of the evaporator, and acting to increase the valve opening with increase of temperature; and means, responsive to the temperature of the refrigerant adjacent an end of the evaporator, for varying the force of said spring in accordance with the temperature of the refrigerant, the spring force being increased with increase of temperature.

2. In a system for cooling a space by vaporization of liquid refrigerant in an evaporator: a valve controlling passage of the refrigerant into the evaporator; a spring biasing said valve toward closed position; thermostatic means effective to open the valve, against the force of said spring, in accordance with the temperature of the refrigerant adjacent the outlet of the evaporator, and acting to increase the valve opening with increase of temperature; and additional thermostatic means, responsive to the temperature of the refrigerant adjacent the inlet end of the evaporator, for varying the force of said spring in accordance with the temperature of the refrigerant adjacent said inlet end, and so that rise of temperature effects increase of the spring force.

3. In a system for cooling a space by vaporization of liquid refrigerant in an evaporator: a valve controlling passage of the refrigerant into the evaporator; a spring biasing said valve toward closed position; thermostatic means, comprising a sealed fluid pressure system charged with a vaporizable liquid, effective to open the valve, against the force of said spring, in accordance with the temperature of the refrigerant adjacent the outlet end of the evaporator, and acting to increase the valve opening with increase of temperature; and additional thermostatic means, comprising a sealed fluid pressure system filled with a thermally expansive liquid and responsive to the temperature of the refrigerant adjacent one end of the evaporator, for varying the force of said spring in accordance with the temperature of the refrigerant adjacent said one end, and so that the force of the spring is increased with rise of temperature.

4. A refrigerant control system, as defined in claim 3, wherein the additional thermostatic means is so arranged as to be responsive to the temperature of the refrigerant adjacent the inlet end of the evaporator.

HAROLD J. MATTESON.